Aug. 19, 1941.  I. COWLES  2,253,018
SWIVEL JOINT FOR CONDUITS
Filed July 17, 1939
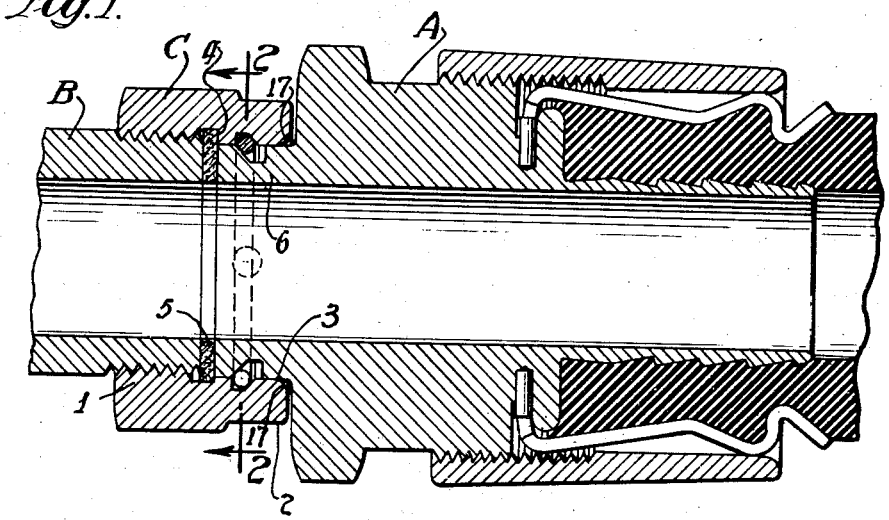
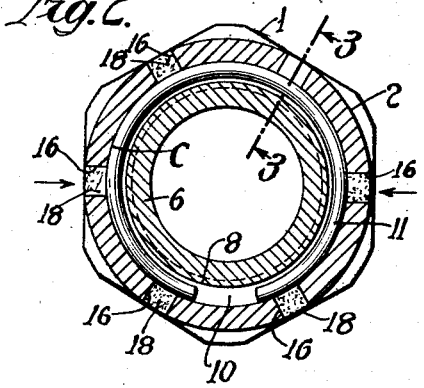
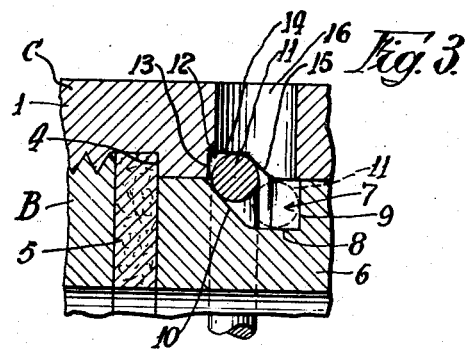
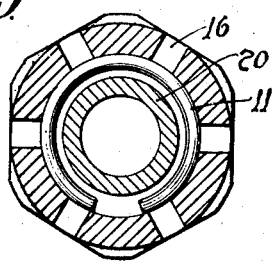
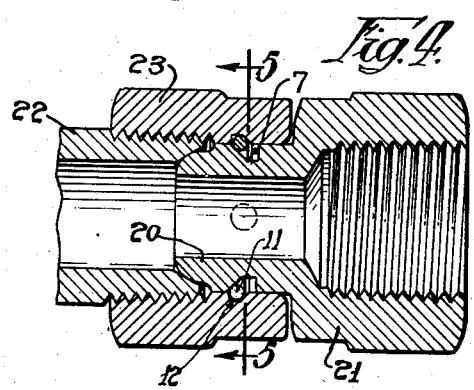
Witness:
E. Camporini
Inventor:
Irving Cowles,
By Rudolph Wm Lotz
Attorney.

Patented Aug. 19, 1941

2,253,018

UNITED STATES PATENT OFFICE 2,253,018

SWIVEL JOINT FOR CONDUITS

Irving Cowles, Detroit, Mich., assignor to said Cowles and Rudolph W. Lotz, Chicago, Ill., as successor co-trustees Application July 17, 1939, Serial No. 284,896

1 Claim. (Cl. 285—97.3)

The present invention relates to a swivel joint for conduits and has for its main object to provide a simple, cheap and detachable joint of this character which is equipped with means for engaging interposed metallic gaskets between opposed surfaces of conduit parts, joined by means of the swivel joint structure, in order to facilitate removal and replacement of such metallic gaskets which are used for high pressure purposes.

Other objects of the invention will be readily understood from or specifically pointed out in the following specification.

A suitable embodiment of the invention is illustrated in the accompanying drawing, wherein:

Fig. 1 is a central, longitudinal, sectional view of a swivel joint conduit coupling constructed in accordance with the invention, as applied for connecting a hose coupling with a pipe.

Fig. 2 is a transverse sectional view of the same taken on the line 2—2 of Fig. 1.

Fig. 3 is a fragmentary detail, longitudinal, sectional view, on an enlarged scale, taken on the line 3—3 of Fig. 2.

Fig. 4 is a sectional view similar to Fig. 1 showing the swivel joint applied to what is commonly known as a ball joint union type of coupling.

Fig. 5 is a cross-sectional view taken on the line 5—5 of Fig. 4.

As shown in Fig. 1, the hose coupling A is connected with a pipe B, the latter being equipped with external threads to engage the internal threads of the swivel joint coupling sleeve C.

The said coupling C comprises a sleeve which is externally hexagonal along the main or threaded portion 1 thereof, as shown in Figs. 1 and 3, and is equipped with a cylindrical portion 2 which is equipped with a cylindrical bore 3 of the same diameter as the threaded portion, threads of the latter being cut in said bore. An annular groove is provided in the sleeve C between the internally threaded end portion thereof and the cylindrical bore 3 of the same to receive the circumferential edge portion of a metallic or other type gasket 5 which is interposed between the end of the pipe B and the terminal end of the shank 6 of the coupling A and rests upon the annular shoulder 4 at the end of the smooth bore 3.

Said shank 6 is equipped with an external annular groove 7 which includes the cylindrical portion 8, a transverse annular shoulder 9 and the tapered shoulder 10 which is disposed preferably at an angle of approximately 45 degrees to the axis of the shank 6 and to the shoulder 9.

The length of the cylindrical wall of the groove 7 is preferably somewhat greater than the diameter of the wire of which the split ring 11 to be received therein is made. The depth of said groove 7 is substantially equal to or slightly greater than the diameter of said wire.

The sleeve C is equipped between the ends of its cylindrical bore portion with an annular internal groove 12 which is equipped with an annular wall or shoulder 13 extending perpendicularly to the axis of said sleeve and which is of appreciably less width than the diameter of the wire of which the split ring 11 is composed and preferably equal to one-half the gauge of said wire. Said groove is also equipped with a cylindrical wall 14 and with a tapered wall 15 parallel with the tapered wall 10 of the annular groove 7 to which it is opposed.

The split ring 11 is composed of a resilient wire which is normally of the same outer diameter or of somewhat greater outer diameter than the cylindrical wall 14 of the said groove 12, so that it will lie normally in snug contact with said cylindrical wall and with the tapered wall 15 of said groove 12.

Radial openings 16 are provided in the sleeve C to connect with the said groove 12, as shown in Figs. 2, 3 and 5, said openings being preferably of about the diameter of the wire of the split ring 11. The purpose of said radial openings 16 is to permit a device or devices to be inserted into diametrically opposed openings 16 to engage and contact the said split ring 11 to its smallest diameter, which is indicated in dotted line in Fig. 3, in order to permit the sleeve C to be removed from the said stem or shank 6 of the coupling A or other device to be coupled with the pipe B.

The outermost end of the cylindrical bore of the sleeve C is radiused as at 17 in Fig. 1 in order that the sleeve may be disposed over the said stem or shank 6 without resorting to the complete contraction of the split ring 11, either digitally or by means of a tool, so that if the said ring is not completely contracted, the said sleeve C may be forced over said ring 11 to complete its contract and moved then to the position of Fig. 3, whereupon said split ring will expand to the position shown in Fig. 3 and lock the sleeve C against disengagement from the shank 6.

The washer 5, either of metal or other material, is introduced into the sleeve C either before or after the latter is engaged with the shank 6, and after engagement of said sleeve C with said shank 6, the pipe B is threaded into place and in effecting compression of the gasket 5, places a stress upon the sleeve C tending to withdraw the same from the shank 6.

By reference to Fig. 3 it will be noted that the split ring 11 is engaged at three different points throughout its arcuate length with the tapered surfaces 10 and 15 of the grooves 7 and 12, respectively, and at one point with the cylindrical wall 14 of said groove 12, and that all pressure exerted upon the ring 11 under the stress last-mentioned, will tend to compress the wire of the ring between the said tapered surfaces 10 and 15 so that the ring actually acts to place an expanding stress upon the cylindrical portion of the sleeve C and a contracting stress upon the shank 6; thus all danger of shearing the said split ring 11 is obviated and the latter is enabled to bear a far greater stress than is common to split rings as ordinarily used. It will be noted that the stress on the ring imposed by the member C is imparted in the direction of the gasket 5 and inasmuch as the two surfaces 10 and 15 are parallel with each other, the tapered surface 15 is absolutely unable to exert a stress on the split ring which will contract it and force it down into the groove 7, it being obvious that the pressure in the last-named direction will tend also to cause the ring 11 to move outwardly from the mouth of the groove 7 rather than inwardly.

When it is desired to remove the sleeve C from the shank 6, the plugs 18 of rubber, or the like, filling the radial openings 16 are removed from the latter. Then the ends of a suitable pair of pliers, for example, are inserted into diametrically opposed openings 16 as indicated by arrows in Fig. 2 to effect contraction of the ring 11 which is thus forced down to dotted-line position illustrated in Fig. 3 and then, while said ring 11 is maintained in this contracted condition, the sleeve C may be easily withdrawn from the shank 6. The contracting means being caused to move with the sleeve C and being thus disengaged from the split ring.

If the gasket 5 is of metal, it will be obvious that it would be practically impossible to remove it by merely removing the end of the pipe B from the sleeve C, due to the fact that the inner diameter of the gasket 5 is equal to the diameter of the bore of the coupling A and could not be engaged by a suitable tool to remove the same. After the sleeve C is removed from the shank 6 and is disengaged from the pipe B, the gasket 5 may be readily removed and replaced. The replacement of said gasket is effected by springing the same into place, which is easily done, in that in forcing the gasket 5 into place past the threads of sleeve C, pressure thereon along one of its faces inwardly of the threads of the sleeve C will cause it to flex to substantially truncated cone form until it becomes seated and thereafter the end of pipe B will restore the same to its normal position shown in Fig. 1.

In the structure of Figs. 4 and 5, the outer end of the shank 20 of the member 21 and the opposed end of the conduit element 22 are formed to cooperate with each other in the conventional manner to form what is known in the pipe-fitting art as a "ball joint union." In this structure no gasket is employed and hence the gasket seating shoulder 4 of the structure of Figs. 1 to 3 is omitted from the sleeve 23 which corresponds to the sleeve B of Fig. 1. In all other respects the structural details covering the split ring and split ring receiving grooves are identical with those of Figs. 1 to 3.

I claim as my invention:

A coupling comprising a female member having a cylindrical bore, a cylindrical male member snugly engaged telescopically with said female member, a resilient and a normally expanded spring ring of round wire, said female member equipped between its ends with an annular groove of a depth substantially equal to one-half the diameter of the wire of which said split ring is composed and said male member equipped between its ends with an annular recess of a depth no less than substantially equal to the diameter of said wire, said groove having a substantially cylindrical bottom wall, a flat end wall perpendicular to its axis, and an annular wall disposed at an angle of substantially 45° to and opposing said flat wall with said split ring normally substantially in contact with said three walls, said recess of said male member having an end wall substantially parallel with and opposed to said angular wall of the said groove and said recess being of such length as to accommodate the split ring when the latter is contracted for disengagement from said groove, the inclined wall of said recess operating to maintain said ring engaged with said inclined and bottom wall of said groove when said male and female members are moved relatively to each other in one direction, said female member provided with diametrically opposed radial openings extending from said flat wall thereof to a point beyond the opposite side of the split ring for admission of means for contacting and disengaging the split-ring from said groove.

IRVING COWLES.